United States Patent [19]
Glaros et al.

[11] Patent Number: 4,986,992
[45] Date of Patent: Jan. 22, 1991

[54] PARTIALLY BAKED CROISSANT AND PASTRY AND METHOD OF MANUFACTURE

[75] Inventors: Timothy L. Glaros, Bloomington, Minn.; Florent Soissons, Alexandria, Va.; Joe McEvoy, Honolulu, Hi.

[73] Assignee: Vie de France Bakery Corporation, McLean, Va.

[21] Appl. No.: 269,414

[22] Filed: Nov. 10, 1988

[51] Int. Cl.$^5$ .............................................. A21D 13/00
[52] U.S. Cl. ...................................... 426/19; 426/556; 426/524
[58] Field of Search .................... 426/556, 524, 19

[56] References Cited

U.S. PATENT DOCUMENTS

| | | | |
|---|---|---|---|
| 3,479,188 | 11/1969 | Thelen | 426/19 |
| 3,566,807 | 3/1971 | Blanchard et al. | 107/54 |
| 3,597,223 | 8/1971 | Gordon | 99/90 R |
| 3,615,678 | 10/1971 | Tangel | 426/19 |
| 3,703,380 | 11/1972 | Langhans | 99/91 |
| 3,821,441 | 6/1974 | Tomita et al. | 426/343 |
| 3,845,219 | 10/1974 | Federico | 426/19 |
| 4,046,920 | 9/1977 | Moline | 426/19 |
| 4,115,596 | 9/1978 | Knutrud | 426/497 |
| 4,350,710 | 9/1982 | Sundermann | 426/19 |
| 4,366,178 | 12/1982 | Reynolds et al. | 426/19 |
| 4,450,177 | 5/1984 | Larson et al. | 426/19 |
| 4,788,067 | 11/1988 | Seneau | 426/19 |
| 4,842,876 | 6/1989 | Anderson et al. | 426/549 |

Primary Examiner—Donald E. Czasa
Assistant Examiner—Mary S. Mims
Attorney, Agent, or Firm—Burns, Doane, Swecker & Mathis

[57] ABSTRACT

A partially baked, laminated dough product such as a croissant or a pastry is made by heating the dough product preferably in an impingement oven to a temperature of about 200° F. to about 210° F. and then immediately freezing the partially baked dough product preferably in a co-current liquid nitrogen freezer so as to prevent a collapse of the partially baked dough product.

19 Claims, 1 Drawing Sheet

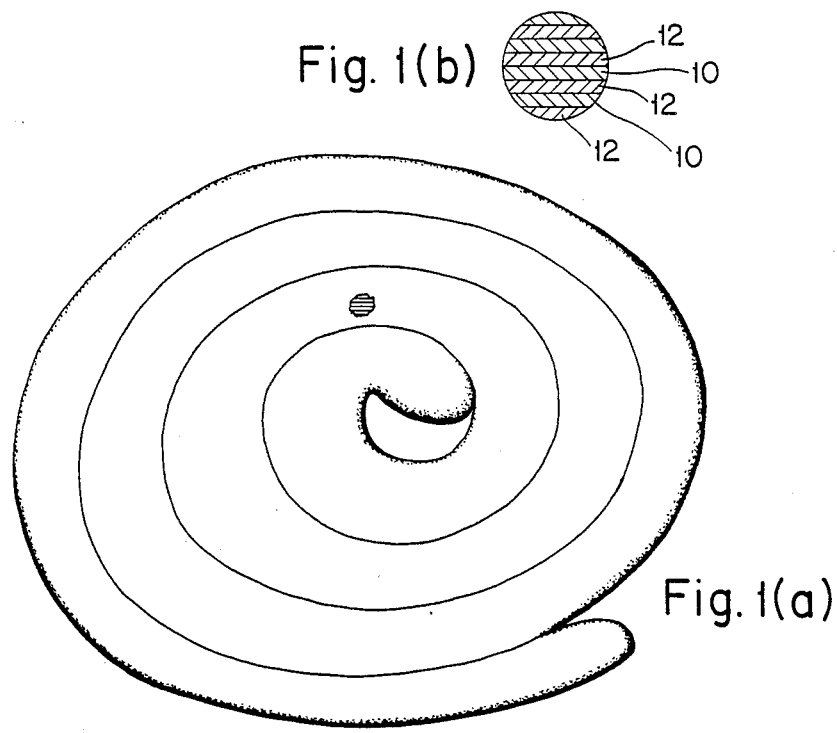
Fig. 1(b)
Fig. 1(a)
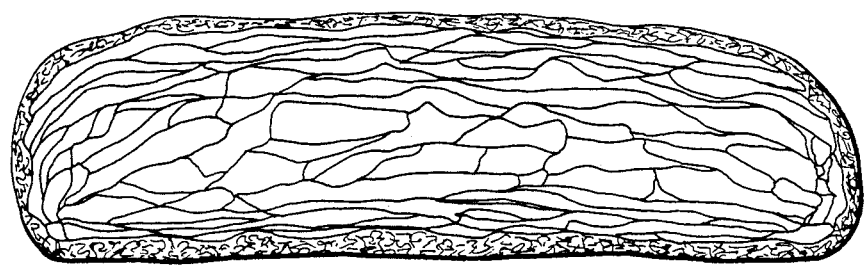
Fig. 2
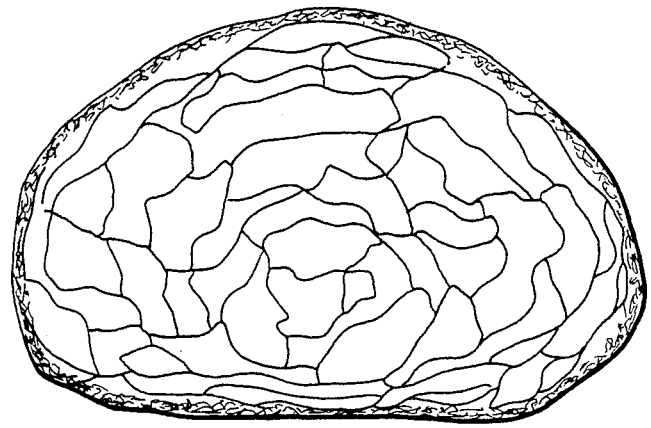
Fig. 3

PARTIALLY BAKED CROISSANT AND PASTRY AND METHOD OF MANUFACTURE

BACKGROUND AND SUMMARY OF THE PRESENT INVENTION

The present invention relates generally to croissants and pastries and to their methods of manufacture and more specifically relates to croissants and pastries which are baked and then frozen as part of the manufacturing process.

Many food products that are made from dough are most appetizing immediately after the product has been baked in an oven. Such products give off aromas and have a texture and moistness that generally lasts only a relatively short time after taking even when the product has been stored in an optimum manner after baking. In order to retain as much of this flavor as possible, it is common to freeze dough products such as croissants shortly after baking and to maintain these fully baked, frozen croissants at a temperature well below freezing during shipment and storage. However, fully baked croissants which have been frozen have a soft texture after thawing unless they are rewarmed. Unfortunately, the rewarming of croissants tends to dry out the croissants.

For these reasons, it is desirable for stores which sell croissants and pastries, for restaurants and for cooks at home to prefer to bake such products themselves, immediately before being sold or eaten. In many situations, however, it is impractical or undesirable to prepare such food products entirely on the premises.

Croissants typically use yeast as a leavening agent and must be proofed (i.e., allowed to rise) before baking. Proofing allows the yeast to metabolize the sugar in the dough to release carbon dioxide gas and ethyl alcohol. The release of the gas causes the dough to expand as the gas fills and enlarges air cells created during mixing and kneading. The proofing step in making dough products can require hours to perform properly and is best carried out in a moist environment at a temperature and relative humidity which has been carefully controlled.

In the case of commercial preparation of croissants, specially constructed proofing cabinets are typically used because of the importance associated with proper proofing. Croissants which have been proofed in such cabinets generally have a better and more uniform appearance and texture than those which have been proofed in an uncontrolled atmosphere.

Croissants that are to be made from frozen dough (dough that has not yet been proofed) typically still require more than three hours of preparation before the croissants are ready to be baked. These three hours include about 45 minutes to one hour to thaw the frozen dough and then about two hours or so to proof the thawed dough.

It is desirable to enable the proofing step to have been performed in advance since then the time needed from freezer to baking will be significantly decreased or eliminated. In addition, many end users do not have adequate proofing boxes and may be untrained in proofing croissants as well. The proofing of dough by an end user which is not a commercial bakery is sufficiently important and difficult to achieve that oftentimes the resulting final product is significantly reduced in quality in comparison with a croissant that has been commercially proofed.

Accordingly, it is desirable to provide croissants in a manner which permits them to be baked immediately before serving yet which minimizes the time and expense involved in the preparation of the croissant prior to baking.

One approach for achieving such an arrangement in dough products including bread is disclosed in U.S. Pat. No. 4,450,177 of Larson et al. and involves the step of freezing the dough after preparation but before baking. Such dough, however, still requires at least about one hour to fully bake a loaf of bread which has been frozen. During the process of baking the product expands by about 50% but does not need to be "proofed" prior to baking.

Another approach involves the partial baking of dough products such as a loaf of bread and then freezing the product prior to shipment. The product has been proofed prior to the partial baking and has only been baked for a portion of the time necessary to complete the baking process. After the partial baking, the product is allowed to cool and then is frozen, typically in a mechanical freezer. When desired, the food product is then placed in an oven (with or without an intermediate step of defrosting) and is baked sufficiently long to obtain the color and temperature desired. Such an approach has the advantage that thawing and proofing are completely unnecessary. In addition, since the product is partially baked by the manufacturer, the baking time needed by the end user is significantly reduced.

Unfortunately, this process is suitable for some but not for all dough products For example, bread, rolls, buns and the like have a relatively fine internal structure which is formed by a relatively uniform distribution of small holes or bubbles. These small holes are formed by the gases given off by the yeast during proofing and during the initial portion of baking and cause the volume of the dough product to expand. Because of the relatively fine internal structure, these dough products can be partially baked, removed from the oven and allowed to cool without collapsing and without a significant change in their appearance or configuration. Subsequently these partially baked dough products can be frozen and stored for weeks or even months before the baking process is completed as discussed above.

Certain dough products such as croissants and puff pastry, however, are unsuitable for such a partial baking, cooling and freezing process. These dough products are formed from a laminated dough in which thin layers of dough are separated from one another by thin layers of fat such as butter or margarine. These laminations cause the dough to have relatively large holes or layers internally when the product has been proofed and baked. These layers give such dough products their distinctive texture and result in a product which is flaky (such as a croissant) rather than spongy (like white bread).

If a croissant or a puff pastry which is formed from a laminated dough is partially baked, allowed to cool and is then frozen, the croissant or puff pastry will collapse. The internal structure of such dough products is unable to maintain the expanded structure unless the product has been baked to completion. After full baking, the internal layers (together with the outside surface) have achieved a sufficient stiffness and rigidity to support the expanded configuration of the product even after cooling.

The need remains therefore for laminated dough products such as croissants and pastries which have been only partially baked and then frozen without collapsing.

Accordingly, it is an object of the present invention to provide partially baked and frozen croissants and pastries which retain a fully expanded configuration.

It is another object of the present invention to provide a method of manufacture of partially baked and frozen croissants and pastries which retain a fully expanded configuration.

Yet another object of the present invention is to provide a laminated dough product which has been proofed and partially baked and then immediately frozen and which can be stored while frozen and then baked to completion.

Yet still another object of the present invention is to provide a method of making a laminated dough product which has been proofed and partially baked and then immediately frozen and which can be stored while frozen and then baked to completion.

Still yet another object of the present invention is to provide a laminated dough product which has been proofed and partially baked to a fully expanded configuration and which can be stored while frozen without collapse and then baked to completion.

Still another object of the present invention is to provide a method of making a laminated dough product which has been proofed and partially baked to a fully expanded configuration and which can be stored while frozen without collapse and then baked to completion.

These and other objects of the present invention are achieved by the method of the present invention wherein a laminated dough product such as a croissant or puff pastry has been partially baked to an internal temperature of between about 200° F. to about 210° F. and is then immediately frozen. In the preferred embodiment, the laminated dough product is partially baked in a tunnel air impingement oven and the product is then immediately frozen in a co-current liquid nitrogen tunnel freezer.

The present invention also includes laminated dough products which are made according to the method of the present invention and wherein the laminated dough products are croissants and pastries.

BRIEF DESCRIPTION OF THE DRAWINGS

Preferred embodiments of the present invention will be described in greater detail with reference to the accompanying drawings wherein:

FIG. 1(a) is a cross-sectional drawing of an unbaked, laminated dough product which has been rolled into the shape of a croissant;

FIG. 2(b) is an enlarged view of a cross-sectional portion of the dough product of FIG. 1(a);

FIG. 2 is a cross-sectional drawing of the laminated dough product of FIG. 1, after being partially baked and allowed to cool; and FIG. 3 is a cross-sectional drawing of the laminated dough product of FIG. 1 after being partially baked and immediately frozen according to the present invention.

DETAILED DESCRIPTION OF THE PREFERRED EMBODIMENTS

A typical dough recipe for making croissants and pastries includes, for example, 100 parts flour, 50 parts water, 10 parts sugar and 2 parts salt. In addition, 5.4 parts milk powder is used or alternatively a corresponding amount of whole milk may be used with an appropriate reduction in the amount of water.

In the case of croissants, generally about 4 parts yeast is also included in the mixture If desired, about 0.5 parts chemical leavening may be added or alternatively, a greater or lesser amount of chemical leavening may be used with an appropriate change in the amount of yeast.

This standard recipe may be modified as desired in order to accommodate individual taste and preference. For example, about 0.5 parts of dough conditioner and about 1.0 parts of vital wheat gluten may be added to enhance the rheological properties of the dough. Whether and to what extend these or other additives may be included depends in large part upon the particular nature of the flour being used. Especially where it is desirable to provide products which are highly uniform in nature, such as in commercial bakeries, the use of such additives to improve uniformity may be common.

Puff pastry differs from croissant pastry typically only in the type of leavening which is used. Croissants are generally leavened by way of yeast or by way of chemical leavening such as baking soda, sodium aluminum phosphate, etc. The dough for puff pastry, however, typically does not include either yeast or chemical leavening and instead, the pastry is steam leavened during baking. The steam is generated during the baking (or partial baking) and causes the laminated dough to expand because the steam is trapped between the laminations. As a result, steam leavened puff pastry has an internal structure that is filled with large air cells in a manner which is substantially the same as the internal structure of croissants.

Although puff pastry dough does not include yeast and therefore does not need to be "proofed" the present invention still has utility in connection with the preparation of puff pastry since such pastry will collapse if only partially baked and allowed to cool. Therefore, the present invention enables a frozen, partially baked puff pastry to be prepared which can be further baked to completion in a relatively short period of time.

Throughout the detailed description of the preferred embodiments, the manufacture of partially baked croissants according to the present invention is described. The description applies equally as well to the manufacture of puff pastry with the exception of the use of yeast and the absence of "proofing" as will be readily apparent to one skilled in the art. Likewise, the present invention may have applicability to croissants which have been provided with a filling or to other dough products which are made from laminated dough and which are susceptible to collapse if only partially baked because of their internal cell structure.

In order to prepare a batch of laminated dough, the various ingredients identified above are mixed together in a conventional manner and the dough is then refrigerated to retard the growth of the yeast. In commercial quantities, a batch of dough may weigh about 300 pounds and is typically divided for ease of handling into balls of about 20 pounds each. If desired, the dough may be weighed to facilitate uniformity. The balls of dough are usually individually placed in a pan and wrapped in plastic wrap so as to prevent drying.

To make the laminated dough, a fat such as butter is layered in the dough in a suitable conventional manner. Depending upon considerations of taste, dietary restrictions, and economy, fats other than butter may be used such as margarine or vegetable fat. The fat is typically folded into the retarded dough using a conventional sheeter or by using a fully or semiautomatic laminating system such as is commercially available in the art.

After being layered with the fat, the laminated dough is again refrigerated to retard the growth of the yeast.

Laminated doughs differ from one another in the number of laminations and in the thickness of each layer. Typically, however, with reference to FIG. 1(a) and to FIG. 1(b), there are from 9 to 64 layers of fat 10 in the dough with each layer of fat 10 being provided between two layers of dough 12. Accordingly, if the dough had only 9 layers of fat, the dough would have 10 layers of dough to make 19 layers in the lamination in all. Generally, there is one more layer of dough 12 than there is of fat 10 so that dough which has 64 layers of fat would have 65 layers of dough to make 129 layers in all.

Croissant dough typically has about 16 layers of fat but may have more layers or fewer layers depending upon size and individual preference for a certain amount of fat.

After the dough has been sufficiently cooled the second time, the retarded dough is cut into pieces and formed into the desired configuration such as by rolling. With reference again to FIG. 1(a), a croissant is typically formed from a triangular shaped piece of the laminated dough which has been rolled from a base of the triangular to the tip.

In a traditional method of making croissants, the dough is initially retarded (after mixing and being weighed or scaled) for between 8 to 24 hours. The fat is then folded into the dough with between 180 to 400 grams of fat used per kilogram of dough. The folding-in of the fat produces a lamination with between 9 to 64 layers of fat 10 as discussed above. The laminated dough is then refrigerated or retarded again for between 2 to 8 hours. Afterwards, the retarded dough is final sheeted, shaped into croissants and then proofed.

In an alternative method of making croissants which is known as straight dough processing the dough is simply allowed to rest for between ½ to 2 hours after mixing and being weighed. The fat is then folded into the dough in the same manner and in the same ratio as in the traditional processing. However, the laminated dough is then retarded only for ½ to 2 hours before final sheeting and being shaped into croissants and proofing. With the use of certain vegetable fats the resting periods may be totally eliminated.

The croissants, after being rolled, are shaped typically by hand and placed on parchment paper or other non-metallic material lined proofing sheets. The proofing sheets are preferably of stainless steel or aluminum to facilitate cleaning and removal of the croissants from the sheets.

Typical proofing sheets are 18" by 26". If the croissants each have a weight of about 3 ounces, each sheet preferably holds 12 croissants in a 3 by 4 array. If the croissants have a weight of about 2 ounces, the sheets may each hold 15 croissants in a 3 by 5 array.

The sheets with the croissants are then placed in a commercial proofer which preferably has a capacity corresponding to the capacity of the oven. Since the croissants according to the preferred embodiment of the present invention are to be baked for from about 10 to 15 minutes in an impingement oven and the croissants are typically proofed for about two hours, the proofer should hold from 8 to 12 times the number of sheets that can be within the oven at any time.

After the croissants have been proofed for the proper amount of time, the croissants should be promptly partially baked. Preferably, the partial baking is performed in an impingement type oven having a conveyor system so as to facilitate a uniform heating of the croissants.

In the preferred embodiment, the sheets holding the croissants are carried from the proofer to the entrance way of the impingement oven. The parchment papers or other traying material carrying the croissants are then slid off of the metal pans and onto the conveyor belt of the tunnel impingement oven. Preferably the croissants are not baked on metal pans since this would decrease the effectiveness of the impingement oven and could likely result in an uneven heating of the croissants. At a minimum, the use of such metal pans would tend to increase the amount of time needed to partially bake the croissants.

Depending upon the particular configuration of the impingement oven, it may be possible to arrange two or more sheets of parchment paper carrying croissants on the conveyor belt side by side through the impingement oven. Although in the preferred embodiment, parchment paper is used, other papers such as synthetic paper and perforated paper or preformed/preshaped containers may be used as desired. Of course, if desired, the use of paper can be eliminated completely and the dough products can be partially baked and immediately frozen directly on the conveyor belts of the oven and freezer.

In either the traditional processing or the straight dough processing, the shaped croissants are proofed for about 2 hours preferably at a temperature of 88° F. in an atmosphere having a relative humidity of about 76%. Preferably the temperature of the proofing box or chamber is maintained at the temperature of 88° F.±2° F. and the relative humidity is maintained at 83%±2%. It is important, however, that the temperature of the proofing step not be sufficiently high so as to melt or break down the particular fat being used.

If the croissants have been properly prepared and proofed, they will have generally doubled in size as a result of the proofing. The proofed croissants are then ready to be baked Until this point, the croissants or any suitable pastry which is made from laminated dough having generally between 9 to 64 layers of fat, is entirely conventional in the art of croissant and pastry preparation.

According to the preferred embodiment of the present invention, the croissants which have been proofed are baked in an impingement oven at a temperature of about 270° F. for about 10 to 15 minutes depending upon the size of the individual croissants.

Alternatively, and in a less preferred embodiment, the croissants may be partially baked in a convection oven for about 25 minutes at a temperature of 270° F. or in any other manner which is appropriate for baking dough products. The use of a tunnel air impingement oven is particularly desirable, however, because of the importance of uniform heating of the product during the partial baking. In an air impingement oven, it is relatively easy to achieve a uniform heating of the croissant on all sides (and on top and on bottom) of the croissant. Convection ovens, however, tend to heat unevenly which would result in one portion of the croissant achieving the desired internal temperature before another portion of the croissant has been sufficiently heated. If the internal temperature of a portion of the croissant is below the desired temperature range, the amount of time which is available to transport the croissant from the oven to the immediate freezing step is reduced and the cooler portion of the croissant may tend to collapse.

The air impingement oven uses a large number of hot air jets to penetrate the "boundary layer" which surrounds food products in an oven. The jets of hot air are typically directed from "fingers" that are distributed across the conveyor belt. In the preferred embodiment, the air impingement oven provides predominantly bottom heat with the bottom fingers spaced only about 1 and ½ inches away from the conveyor. The top fingers are spaced about 5 inches from the conveyor. A multitude of finger adjustments may be used depending on the size of the product and air velocity.

A suitable air impingement oven is the Jet Sweep Tunnel Oven which is available, for example, from Enersyst, Inc. of Dallas, Tex. and which may have a plurality of heating zones and a conveyor belt for carrying the dough products through the oven. The conveyor speed is preferably variable so as to enable the baking time to be adjusted depending upon the size and shape, etc. of the croissants and pastries and the temperature and heating characteristics of the oven.

Whatever baking method is used, it is desired that the croissants and pastries reach an internal temperature of between about 200° F. to 210° F. At this internal temperature, the croissants are fully expanded but are still white or off-white in color. The croissants have not yet begun to change color into the characteristic brown or golden brown of breads, pastries and croissants. Then the partially baked croissants are immediately placed in a cryogenic freezer while still on the baking sheets of parchment paper.

If the croissants should be partially baked on metal baking sheets, it is especially desirable not to insert such metal pans into the freezer since the metal pans will significantly affect the ability of the freezer to immediately freeze the outside of the croissant. In addition, the hot metal pans will require a significant increase in the freezing capacity of the freezer and will make a uniform freezing of the croissants difficult or impossible since the hot metal pans (and therefore the bottom of the croissant adjacent to the pans) will not cool as rapidly as the top surface of the croissant.

If the internal temperature of the croissants is below the desired temperature of about 200° F. to 210° F., the time available to transfer the partially baked croissants from the oven to the freezer without collapse is generally reduced. Likewise, heating the croissants to a temperature beyond 210° F. will begin to brown the croissants and will also begin to boil off the moisture in the croissants. Therefore, it is important that the internal temperature of the croissants be carefully determined in order to obtain optimum quality in the partially baked croissants.

In this regard, "immediately" means that the croissants are preferably moved from within the oven to within the freezer in about 30 seconds or less and preferably no more than about 60 seconds for a croissant having a weight of about 3 ounces and no more than about 120 seconds for a croissant having a weight of about 2 ounces. The heavier the croissant, the larger the dimensions of the croissant and therefore the greater tendency of the croissant to collapse.

With reference to FIG. 2, if the partially baked croissants are not immediately frozen according to the present invention, the partially baked croissants will collapse. That is, the cell structure of the partially baked croissant is unable to support the weight of the croissant if the croissant is allowed to cool (rather than being immediately frozen).

With reference to FIG. 3, a partially baked croissant which has been immediately frozen according to the present invention retains its expanded configuration and does not collapse to the extreme degree that a frozen proofed unbaked croissant does, even if it is allowed to thaw.

In the preferred embodiment the freezing step is carried out in a co-current liquid nitrogen cryogenic freezer having an internal temperature of about −150° F. The croissants are quickly frozen in the freezer so as to have a core temperature of about 25° F. or less. After freezing, the croissants are packaged and maintained in the frozen configuration until desired to be prepared for consumption.

The partially baked croissants are frozen by impinging liquid nitrogen at a temperature of about −320° F. onto the top and the bottom of the croissants to instantly freeze the outside of the croissant. This instantaneous freezing of the outside will prevent the collapse of the croissant while the internal temperature of the croissant is being quickly reduced.

The liquid nitrogen will immediately vaporize upon contact with the hot croissants and will freeze the croissant to a core temperature of less than 25° F. and preferably 0° F. The complete freezing of the croissants will typically require from about 10 to 11 minutes.

In the preferred embodiment, the croissants are immediately frozen by placing the croissants in a co-current liquid nitrogen tunnel freezer such as the Nitroshield System which is available from Liquid Carbonic of Chicago, Ill. The liquid nitrogen tunnel freezer preferably has a conveyor belt which has an adjustable speed so that the transit time of the croissants through the freezer can be adjusted as necessary. In co-current liquid nitrogen freezer, the liquid nitrogen is sprayed at the inlet to the freezer onto the hot croissants. Such an arrangement is particularly desirable in the case of partially baked laminated dough products since the liquid nitrogen will immediately freeze the outside of the laminated dough product.

In the case of a counter current liquid nitrogen freezer, the hot croissants are initially cooled only by the nitrogen vapor which is being blown through the freezer from the exit way to the entrance way of the freezer. Such nitrogen vapor, although very cold, cannot freeze the surface of the hot croissants as quickly as can the spray of liquid nitrogen in a co-current liquid nitrogen freezer. Therefore the possibility of collapse is minimized or eliminated in the case of the co-current liquid nitrogen freezer.

In practice, freezers other than liquid nitrogen freezers have not been able to provide satisfactory results. Mechanical freezers simply do not have a sufficiently cold temperature nor do they provide the essentially instantaneous initial freezing of the outside of the croissants which can be achieved in a co-current liquid nitrogen tunnel freezer. Even co-current liquid carbon dioxide freezers appear to be relatively undesirable and unable to freeze the croissants quickly enough so as to avoid collapse.

So as to also minimize any damage to the frozen croissants and to prevent an inadvertent thaw during shipping and handling, the frozen croissants are preferably packed into cases. In a preferred embodiment, one sheet of croissants is provided on each tray of a case with five or six trays placed within a polyethylene liner in a corrugated box. The bag is twist tied to prevent vapor loss and the case is then sealed. By using the parchment paper sheets or similar devices to place the croissants on the trays, handling of the croissants is minimized and the possibility of defrosting (from hand-packing) is reduced or eliminated. Furthermore, the amount of labor involved in packing is reduced as compared with hand-packing and the end user may complete the baking process using the parchment paper without the use of another pan liner.

As desired, the frozen, partially baked croissants are "reconstituted" preferably by placing a sheet of croissants, still on the parchment paper or similar devices, in a convection oven for about 5 minutes at a temperature of 325° F. until the desired color is obtained in the croissants.

The partially baked croissants made according to the present invention will not severely collapse if defrosted but if the croissants are defrosted and refrozen, the thin skin or crust of the croissants may have a tendency to peel.

The method of partially baking and immediately freezing croissants can be applied to croissants and to various pastries which include yeast, or which are chemically leavened or steam leavened and made from laminated dough so as to obtain an internal structure (or "grain") which is comprised of large air cells defined by thin, translucent membranes. Such cells are typically evenly distributed throughout the interior of the product and will collapse after partially baking unless they are further processed as disclosed in the present invention. The cell structure of such dough products if partially baked (and not immediately frozen as disclosed herein) is unable to avoid collapse unless fully baked so as to set and solidify the cell network.

The principles, preferred embodiments and modes of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others without departing from the spirit of the present invention and it is expressly intended that all such variations and changes which fall within the spirit and scope of the present invention as defined in the claims, be embraced thereby.

What is claimed is:

1. A method of making a partially baked, laminated dough product, said laminated dough including from 9 to 64 layers of fat, comprising the steps of:
    preparing an unbaked, laminated dough product;
    heating said unbaked, laminated dough product to form a partially baked, laminated dough product having a core temperature of between about 200° F. to 210° F., said partially baked, laminated dough product having increased in size to a final desired configuration;
    immediately freezing said partially baked, laminated dough product, the outside surface of the partially baked, laminated dough product being cooled from said temperature of between about 200° F. to 210° F. to a temperature of about 25° F. or less within about two minutes, whereby the structure of the partially baked, laminated dough product does not collapse, 2. The method of claim 1 wherein said immediate freezing step is performed by spraying liquid nitrogen onto the partially baked, laminated dough product.

3. The method of claim 1 wherein the step of heating is performed in an air impingement oven at a temperature of about 270° F.

4. The method of claim 1 wherein the laminated dough includes yeast and wherein the laminated dough is proofed prior to said heating step.

5. The method of claim 1 wherein said partially baked, laminated dough product has a white or an off-white appearance.

6. A partially baked croissant made according to the method of claim 1.

7. The method of claim 2 wherein the step of heating is performed in an air impingement oven at a temperature of about 270° F. and wherein the laminated dough includes yeast and is proofed prior to said heating step.

8. A partially baked croissant made according to the method of claim 7.

9. A partially baked pastry made according to the method of claim 1.

10. A method of making a partially baked, laminated dough product, said laminated dough including from 9 to 64 layers of fat, comprising the steps of:
    preparing an unbaked, laminated dough product;
    heating said unbaked, laminated dough product in an air impingement oven to form a partially baked, laminated dough product having a core temperature of between about 200° F. to 210° F., said partially baked, laminated dough product having increased in size to a final desired configuration and having a white or off-white appearance:
    immediately spraying said partially baked, laminated dough product with liquid nitrogen in a co-current liquid nitrogen freezer to freeze said partially baked, laminated dough product, the outside surface of the partially baked, laminated dough product being cooled from said temperature of between about 200° F. to 210° F. to a temperature of about 25° F. or less within about two minutes, whereby the structure of the partially baked, laminated dough product does not collapse.

11. The method of claim 10 wherein said laminated dough product is proofed prior to said heating step.

12. The method of claim 11 wherein said partially baked, laminated dough product is maintained at a temperature below 32° F. during storage and shipment and is subsequently heated sufficiently to make said partially baked, laminated dough product brown or golden brown in appearance.

13. The method of claim 12 wherein said subsequent heating is performed in an oven at a temperature of about 325° F. for about five minutes.

14. The method of claim 10 wherein said unbaked, laminated dough product is provided on a sheet of non-metallic material and wherein said laminated dough product remains on said sheet of non-metallic material during said heating step and said immediate freezing step.

15. The method of claim 13 wherein said unbaked laminated dough product is provided on a sheet of non-metallic material and wherein said laminated dough product remains on said sheet of non-metallic material during said heating step and said immediate freezing step and during said subsequent heating step.

16. The method of claim 10 wherein said unbaked, laminated dough product is provided on a sheet of parchment paper or similar non-metallic traying material and wherein said laminated dough product is placed directly on a conveyor belt of said impingement oven and then directly on a conveyor belt of said co-current liquid nitrogen freezer during said heating step and subsequent freezing step.

17. A partially baked croissant made according to the method of claim 10.

18. A partially baked croissant made according to the method of claim 16.

19. A partially baked pastry made according to the method of claim 10.

* * * * *